(12) United States Patent
Decker

(10) Patent No.: US 11,684,948 B2
(45) Date of Patent: *Jun. 27, 2023

(54) MULTI-PAN COATING ASSEMBLY FOR PARTICULATE MATERIAL

(71) Applicant: Freund-Vector Corporation, Marion, IA (US)

(72) Inventor: Nicholas Decker, Cedar Rapids, IA (US)

(73) Assignee: Freund-Vector Corporation, Marion, IA (US)

( * ) Notice: Subject to any disclaimer, the term of this patent is extended or adjusted under 35 U.S.C. 154(b) by 146 days.

This patent is subject to a terminal disclaimer.

(21) Appl. No.: 17/247,057

(22) Filed: Nov. 25, 2020

(65) Prior Publication Data

US 2021/0078034 A1 Mar. 18, 2021

Related U.S. Application Data

(62) Division of application No. 15/874,546, filed on Jan. 18, 2018, now Pat. No. 11,224,893.

(51) Int. Cl.
| | |
|---|---|
| *B05C 19/06* | (2006.01) |
| *B05C 1/08* | (2006.01) |
| *B05B 13/02* | (2006.01) |
| *A23G 3/26* | (2006.01) |
| *B05B 16/00* | (2018.01) |

(52) U.S. Cl.
CPC ............ *B05C 19/06* (2013.01); *A23G 3/26* (2013.01); *B05B 13/0257* (2013.01); *B05B 16/90* (2018.02); *B05C 1/08* (2013.01)

(58) Field of Classification Search
CPC .......... B05D 3/08; B65H 18/10; B05C 19/06; B05B 13/0257; B62B 3/04
See application file for complete search history.

(56) References Cited

U.S. PATENT DOCUMENTS

| | | | | |
|---|---|---|---|---|
| 4,219,186 A | * | 8/1980 | Brewer | B62B 3/04 254/90 |
| 6,820,835 B2 | | 11/2004 | Cavaliere et al. | |
| 8,671,872 B2 | * | 3/2014 | Pilipauskas | B01J 2/006 118/19 |
| 11,224,893 B2 | * | 1/2022 | Decker | B05B 13/0257 |

FOREIGN PATENT DOCUMENTS

EP 0709327 B1 1/1996

* cited by examiner

*Primary Examiner* — Dah-Wei D. Yuan
*Assistant Examiner* — Andrew J Bowman
(74) *Attorney, Agent, or Firm* — McKee, Voorhees & Sease, PLC

(57) ABSTRACT

A spray coating machine and process accommodates coating pans of various sizes and simplifies cleaning after particulate material in the pan is coated. A selected pan is supported on a trolley carried by a wheeled cart. After the cart is positioned adjacent the coating machine, the trolley and pan are extended into the machine, and then the pan lifted for support by a rotatable drive shaft and castors. The trolley is then removed from the machine, and the door is closed so that the coating process can commence. When coating is complete, the door is opened, and the trolley extended into the machine under the pan and raised for removal of the castors. Then, the trolley and pan are withdrawn from the machine. The trolley does not need cleaning after spraying, since the trolley is outside the machine during spraying of the coating solution.

18 Claims, 21 Drawing Sheets

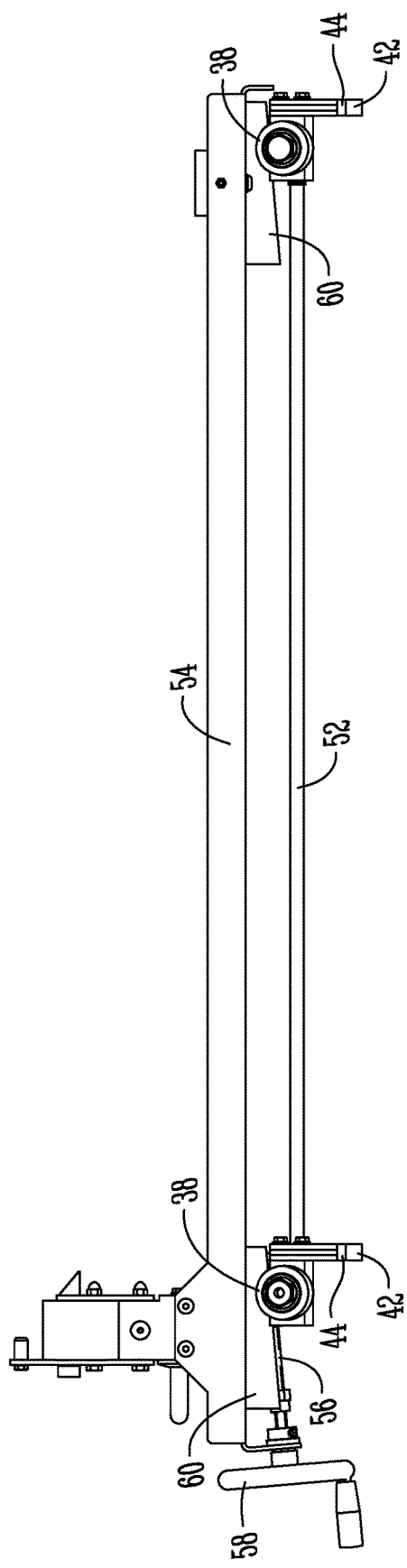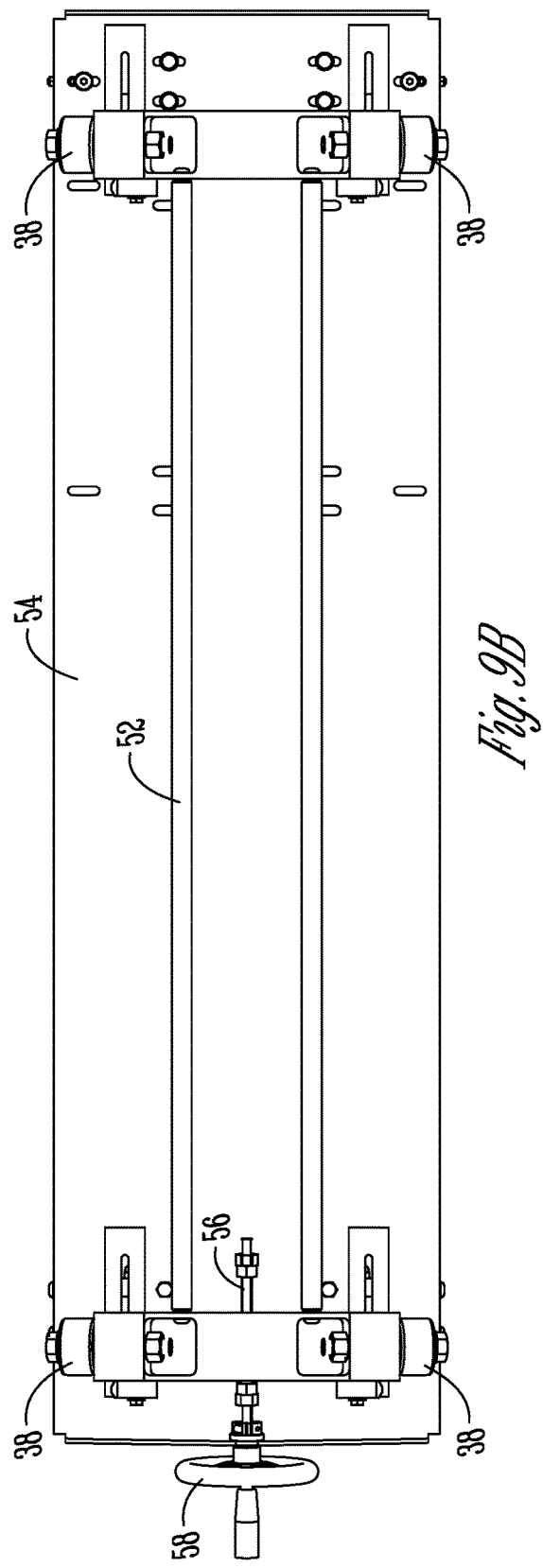

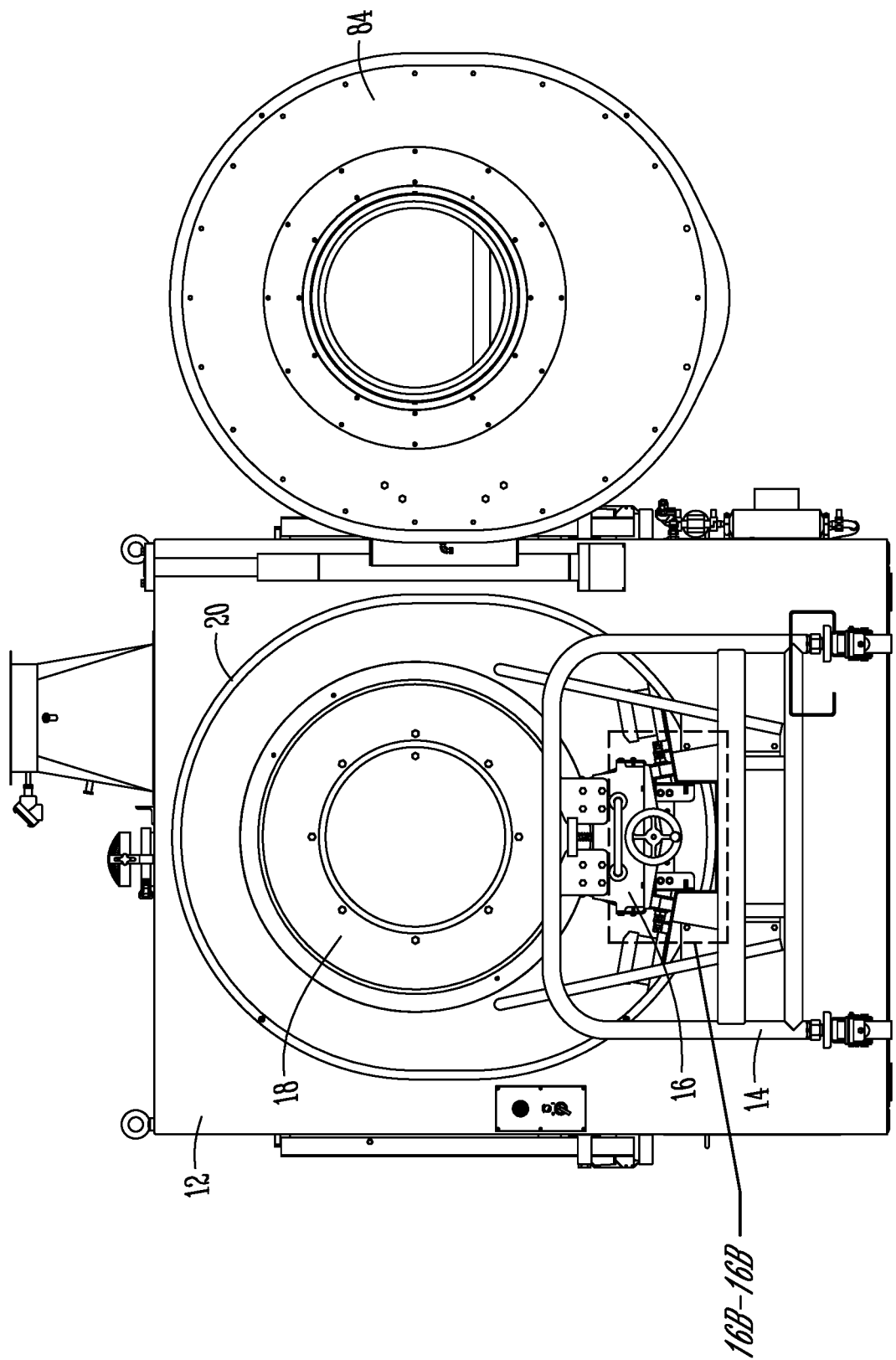

MULTI-PAN COATING ASSEMBLY FOR PARTICULATE MATERIAL

CROSS-REFERENCE TO RELATED APPLICATIONS

This application is a divisional of nonprovisional application U.S. Ser. No. 15/874,546, filed on Jan. 18, 2018, which is herein incorporated by reference in its entirety.

BACKGROUND OF THE INVENTION

Processes and equipment for spray coating tablets, seeds, and other particulate material are well known. In one type of spray system, the material is placed into a drum, which is then rotated as a solution is sprayed onto the tumbling material. Some systems utilize interchangeable drums or pans of different sizes, depending upon the material being coated and the volume of the material. The drums vary significantly in size, for example, having diameters of 32 inch-66 inch and lengths of 28 inch-100 inches. The empty pan or drum can weigh 100 to 750 pounds. The large size and weight make the drums difficult to change in a machine, such that most tablet coating machines using large pans or drums have a dedicated pan which is not designed to be routinely removed after installation. In such machines, cleaning is difficult since the drum cannot or is not be removed.

In coating systems which accommodate interchangeable drums, but these machines are still difficult to clean when the pan or drum is inside the machine or enclosure.

Often, it is desired or required that after the coating operation, the pan be cleaned inside the machine housing so that coating material and/or other debris can be washed from the pan or drum and contained inside the housing, so as to limit operator exposure from the spray solution or material being coated. Operator exposure may be critical depending upon what is being coated. For example, if the machine is used to coat potent compounds, such as hormones, operator exposure is a strong consideration, and removing a dirty pan may not be allowed, such that the pan must be cleaned inside the housing. If the pan is supported in the housing by a cart or trolley, those structures must also be cleaned inside the housing, which is more difficult than cleaning the pan alone. If a dirty pan is removed from the housing, the room or area exposed to the pan may be considered dirty as well, depending on the hazard posed by the tablet and/or coating solution, thus necessitating cleaning of the room or area.

Therefore, a primary objective of the present invention is the provision of a multi-pan product coating assembly that accommodates drums of different sizes and simplifies cleaning.

Another objective of the present invention is a provision of a particulate material coating machine having a pan or drum which can be quickly and easily moved into and out of the machine.

A further objective of the present invention is a provision of a tablet coater which utilizes a trolley for moving drums of different sizes between a product loading position outside the spray enclosure and a coating position inside the spraying enclosure.

Still another objective of the present invention is the provision of a particulate product coating machine which utilizes a trolley for positioning the coating pan within the machine, and removing the empty trolley from the machine while the drum remains inside the machine for the coating process.

Yet another objective of the present invention is the provision of a method of positioning a tablet coating pan to and from a tablet coating enclosure for rotation therein.

Another objective of the present invention is the provision of a multi-pan production tablet coater which temporarily supports the coating pan on a trolley before and after the coating process.

Another objective of the present invention is the provision of a trolley cart which can raise and lower a coating pan for positioning within a spray coating machine housing.

A further objective of the present invention is the provision of a portable coating pan which can be selectively positioned within a coating machine and having a simple drive connection between the pan and the machine.

Still another objective of the present invention is a provision of a tablet coating assembly utilizing interchangeable pans supported on a rolling cart which indexes with the machine housing for accurate positioning of the pan within the housing.

Another objective of the present invention is a provision of a multi-pan coating machine for particulate material which is economical to manufacture, simple to use, and easy to clean.

These and other objectives will become apparent for following description of the invention.

SUMMARY OF THE INVENTION

A coating assembly is provided for particulate material, such as tablets, which accommodate different sized pans or drums. The pan/drum is positioned on a trolley, which in turn is supported by a wheeled cart. The cart and trolley are used to move the pan into the machine housing or coating chamber, wherein the drum is removed from the trolley, and then the trolley withdrawn from the enclosure before the coating process begins. After the coating process is completed, the trolley is moved back into the enclosure to pick up the drum, which is then withdrawn from the enclosure. The coated product is normally removed from the drum before drum removal or exchange.

The trolley is rollably supported on the cart, such that the trolley can be extended and retracted to and from an opening in the machine housing. The trolley can also raise and lower the drum for positioning within the housing.

The pan is supported in the housing on rollers for rotation during the coating process. A coupling on the end of the drum connects to the rotatable drive of the machine.

BRIEF DESCRIPTION OF THE DRAWINGS

FIG. 9A is a side elevation view of the trolley in a lowered position.

FIG. 9B is a bottom plan view of the trolley.

FIG. 16A is an end view showing the pan positioned within the coating machine housing, with the housing door open.

DETAILED DESCRIPTION OF THE PREFERRED EMBODIMENTS

Figure 1:
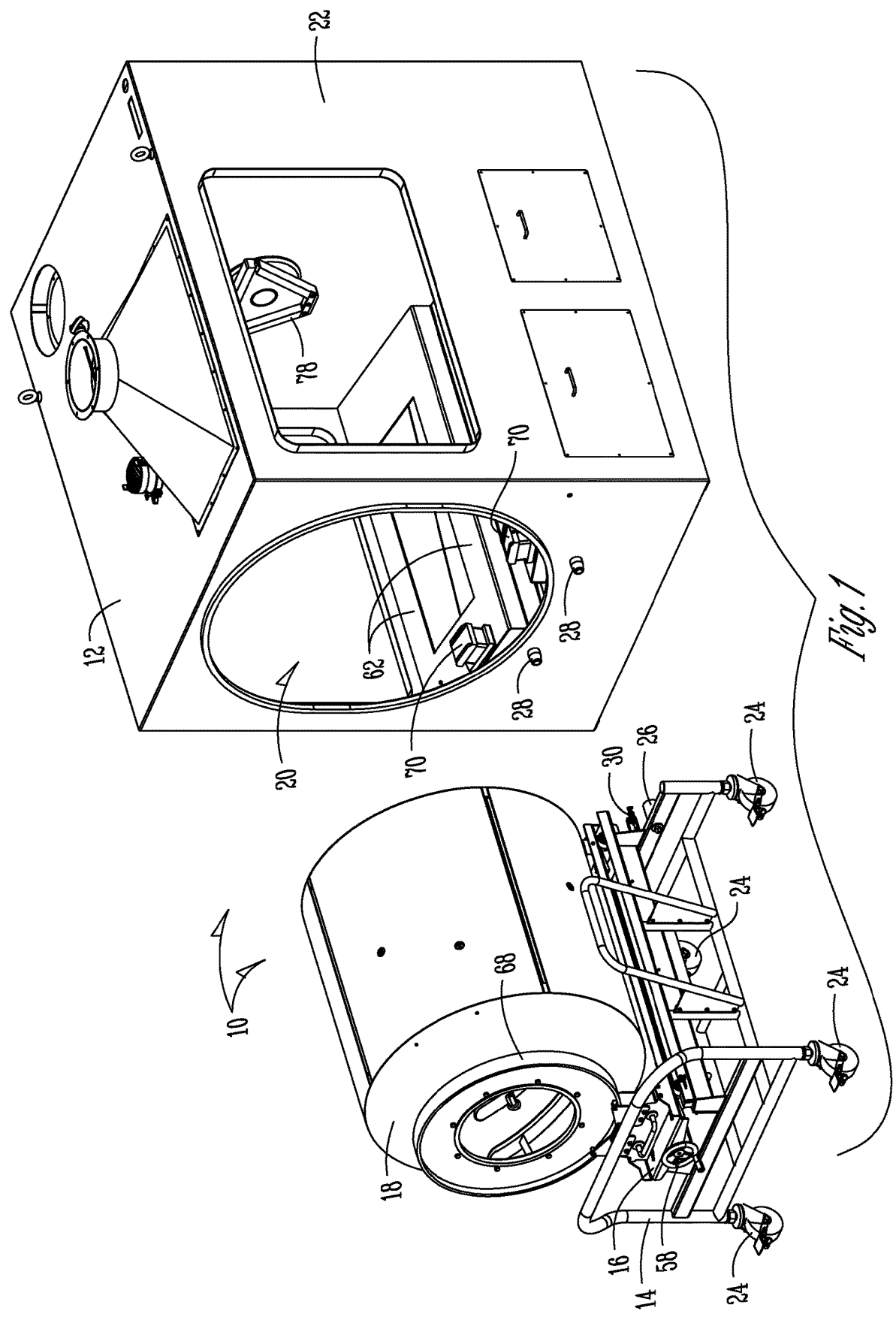
FIG. 1 is a perspective view showing the cart, trolley and drum apart from the machine housing, with the housing door removed for clarity.

The multi-pan coating assembly of the present invention is generally designated by the reference numeral 10 in the drawings. The assembly 10 includes four primary components: the spray machine or booth 12, a cart 14, a trolley 16, and a coating pan or drum 18. The pan 18 is supported by the trolley 16, which in turn is supported by the cart 14. The cart 14 and trolley 16 can be positioned adjacent the spray machine 12 for positioning the pan 18 through an opening 20 in the machine housing 22 for coating tablets or other particulate material contained within the pan 18. The machine 12 includes a sprayer system (not shown) which extends into the pan 18 when the pan is positioned within the housing 22 for spraying a coating solution onto the material in the pan 18 as the pan rotates.

More particularly, the cart 14 includes wheels 24 so that the cart 14 can be rolled toward and away from the machine housing 22. The forward end of the cart 14 includes extensions 26 which engage with bosses 28 on the front of the housing 22 so as to provide an indexing system for proper positioning of the cart 14 with the housing 22. The cart 14 also includes at least one latch 30 on the forward end adapted to retentively engage a hook 32 on the front of the housing 22 so as to lock the cart 14 to the machine 12 while the pan 18 is being moved into and out of the housing 22.

Figure 2:
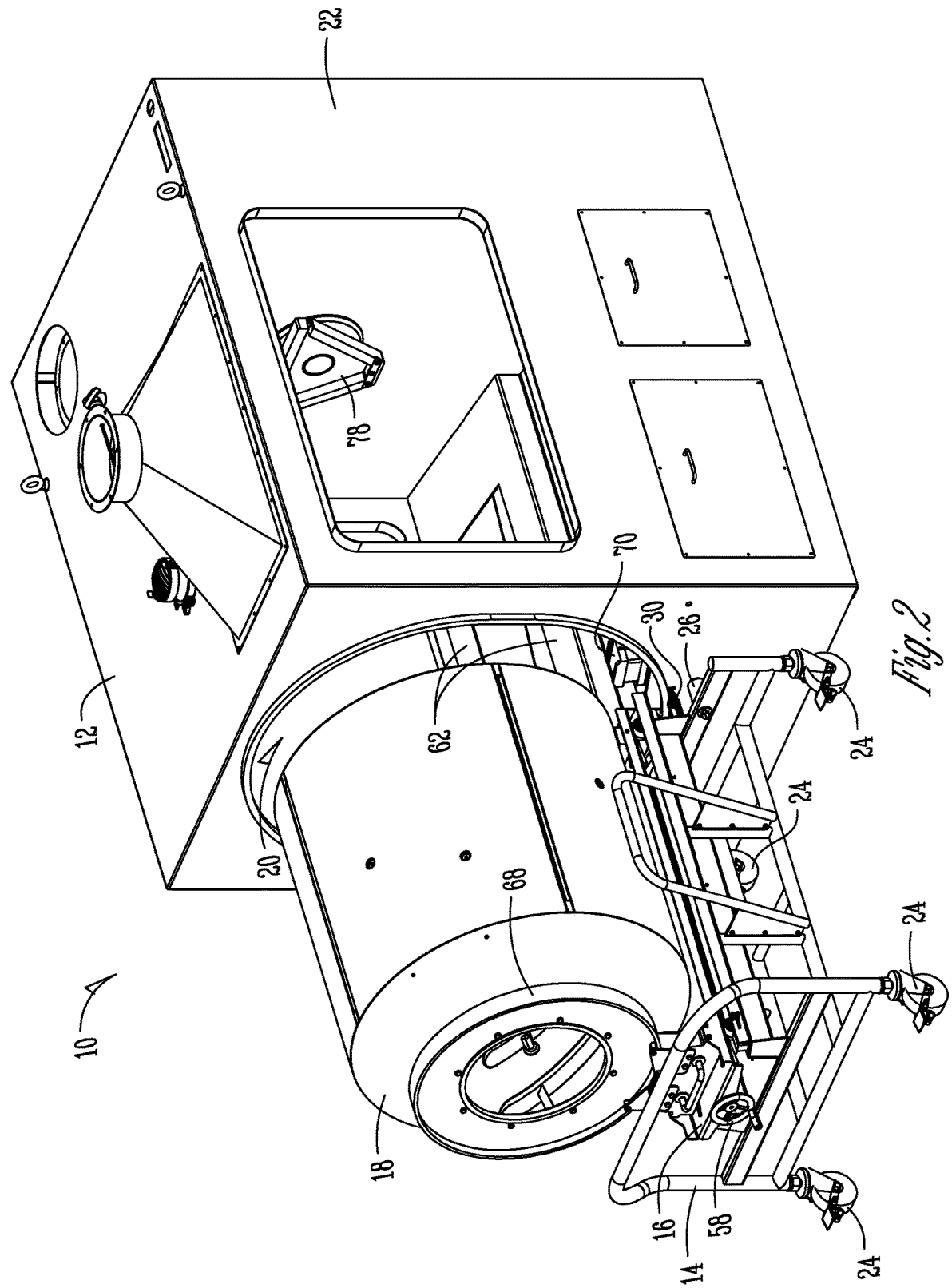
FIG. 2 is a perspective view showing the cart, a trolley and pan adjacent the machine housing.
Figure 3:
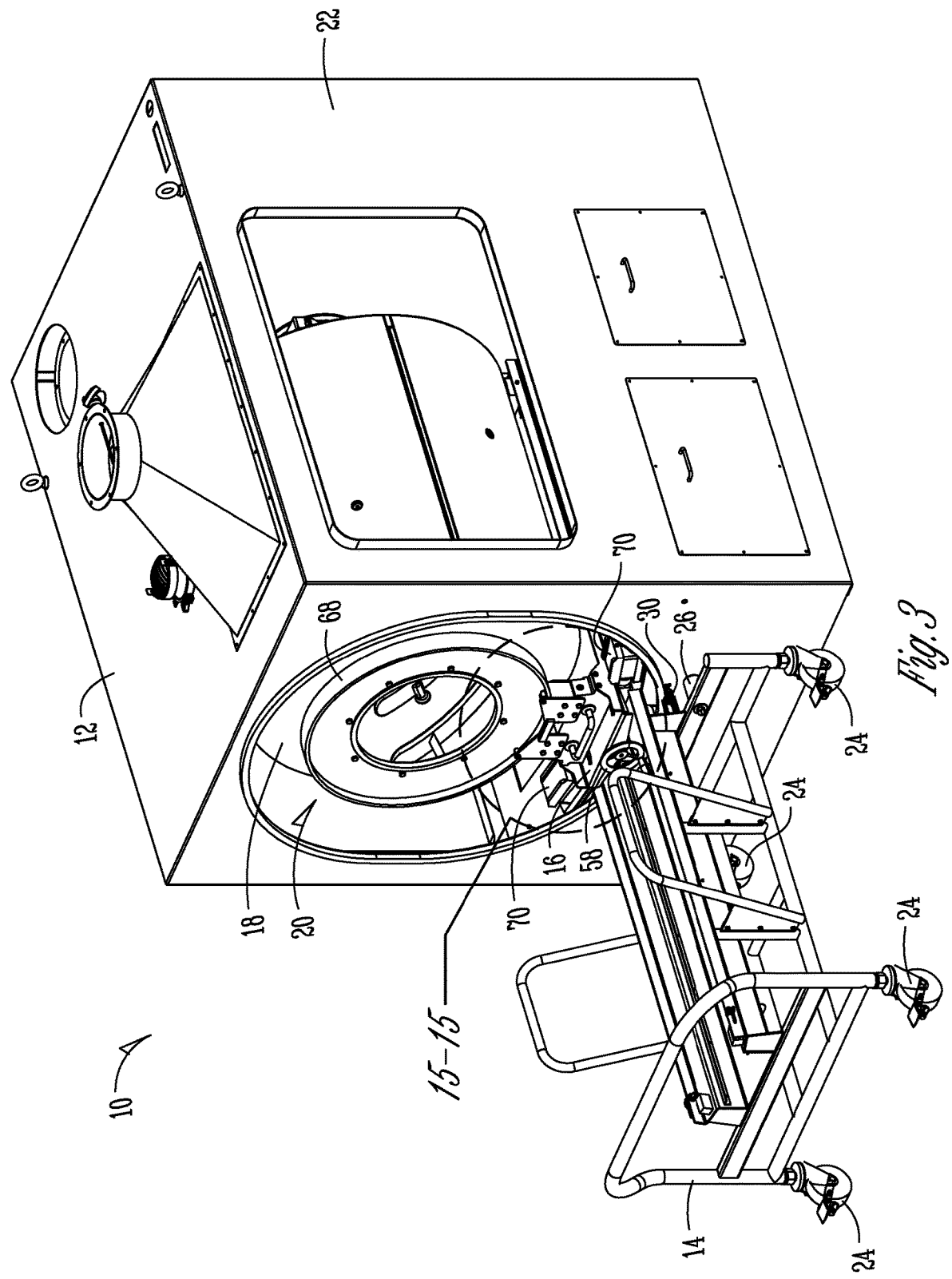
FIG. 3 is a perspective view showing the trolley and pan positioned within the housing.
Figure 4:
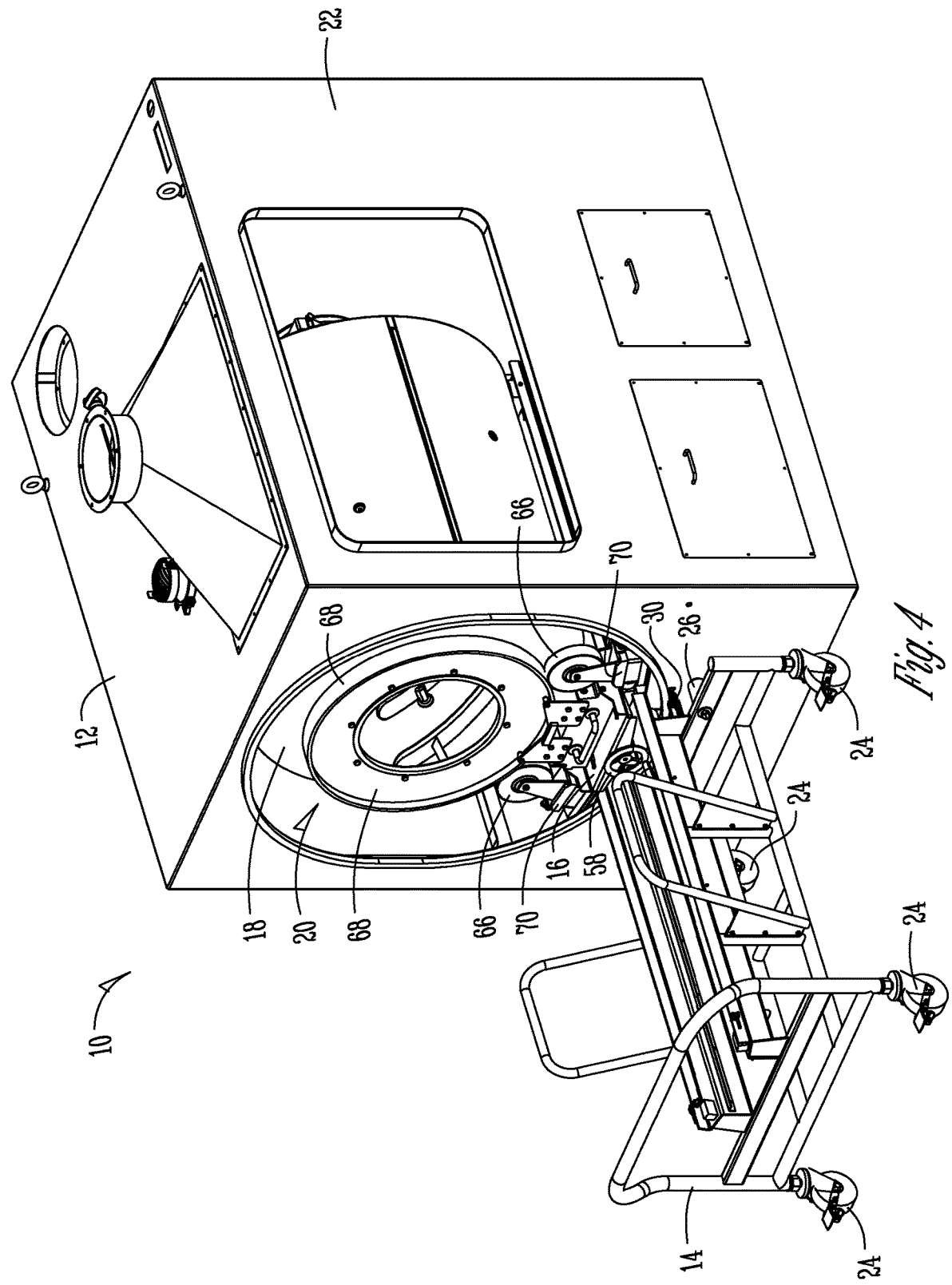
FIG. 4 is a view similar to FIG. 3 showing the support rollers added to the housing for rotatably supporting the pan.
Figure 5:
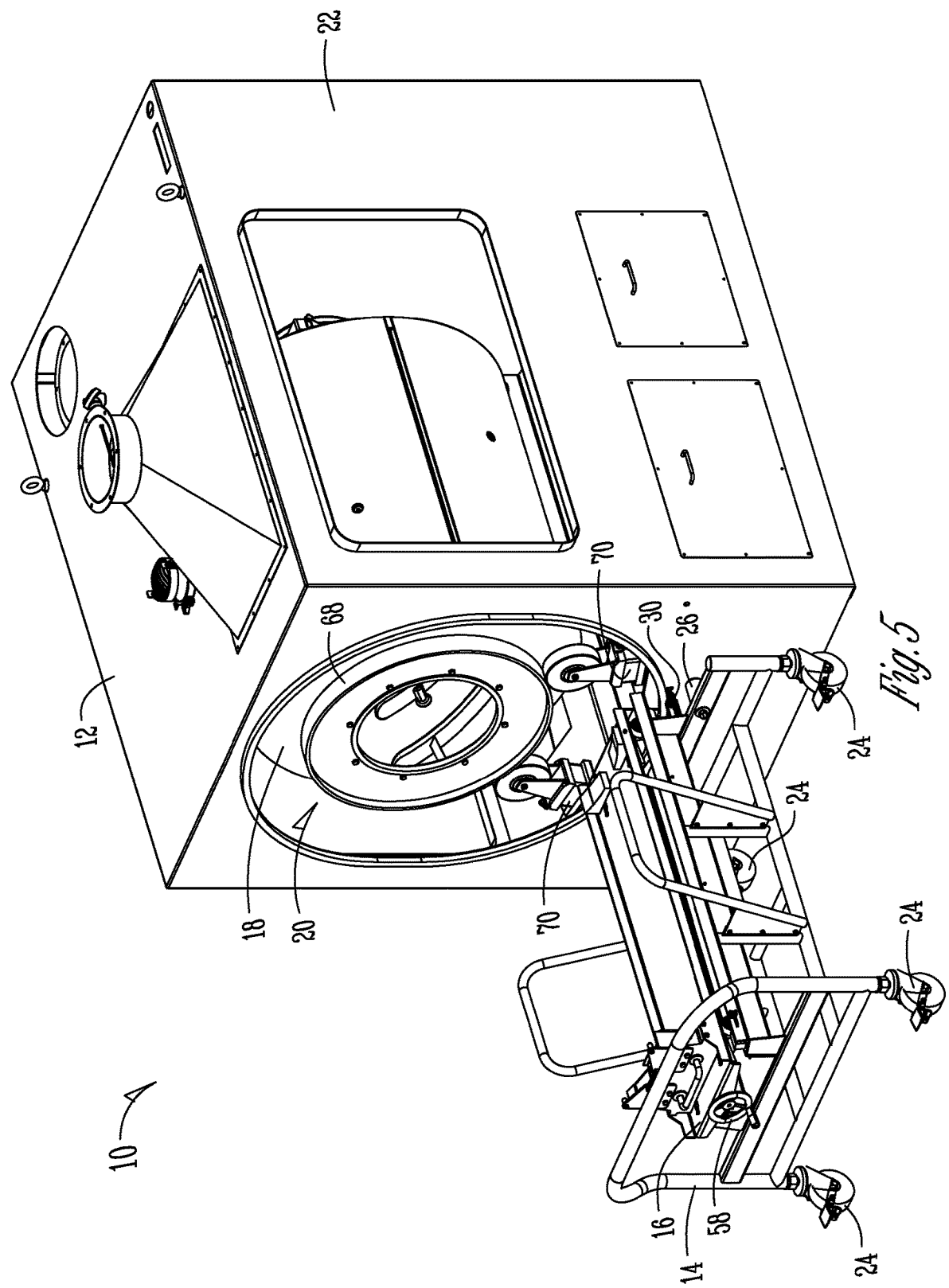
FIG. 5 is a view similar to FIG. 4, but with the trolley withdrawn from the housing.
Figure 6:
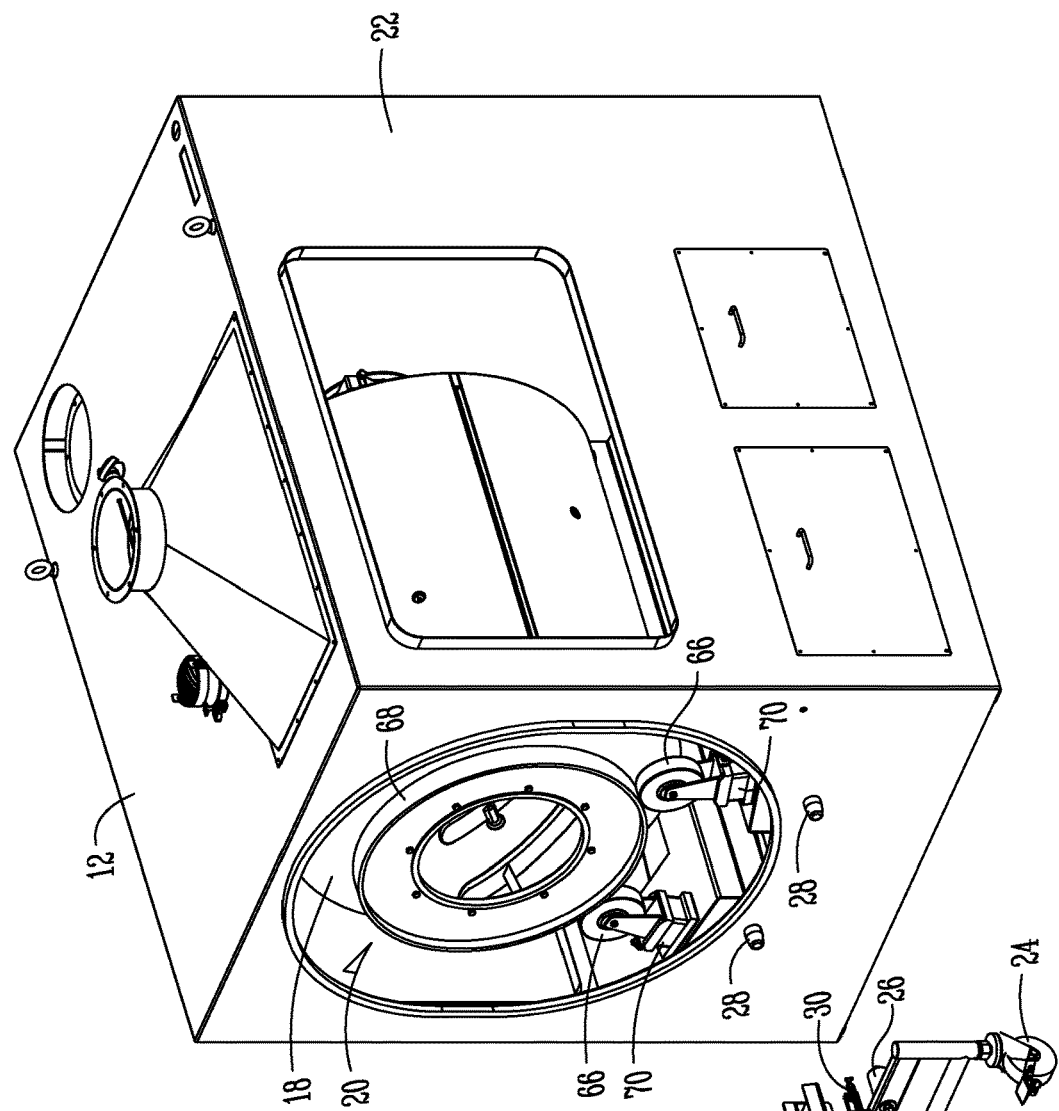
FIG. 6 is a perspective view showing the cart and trolley spaced from the machine housing and with the drum positioned within the machine housing.
Figure 7:
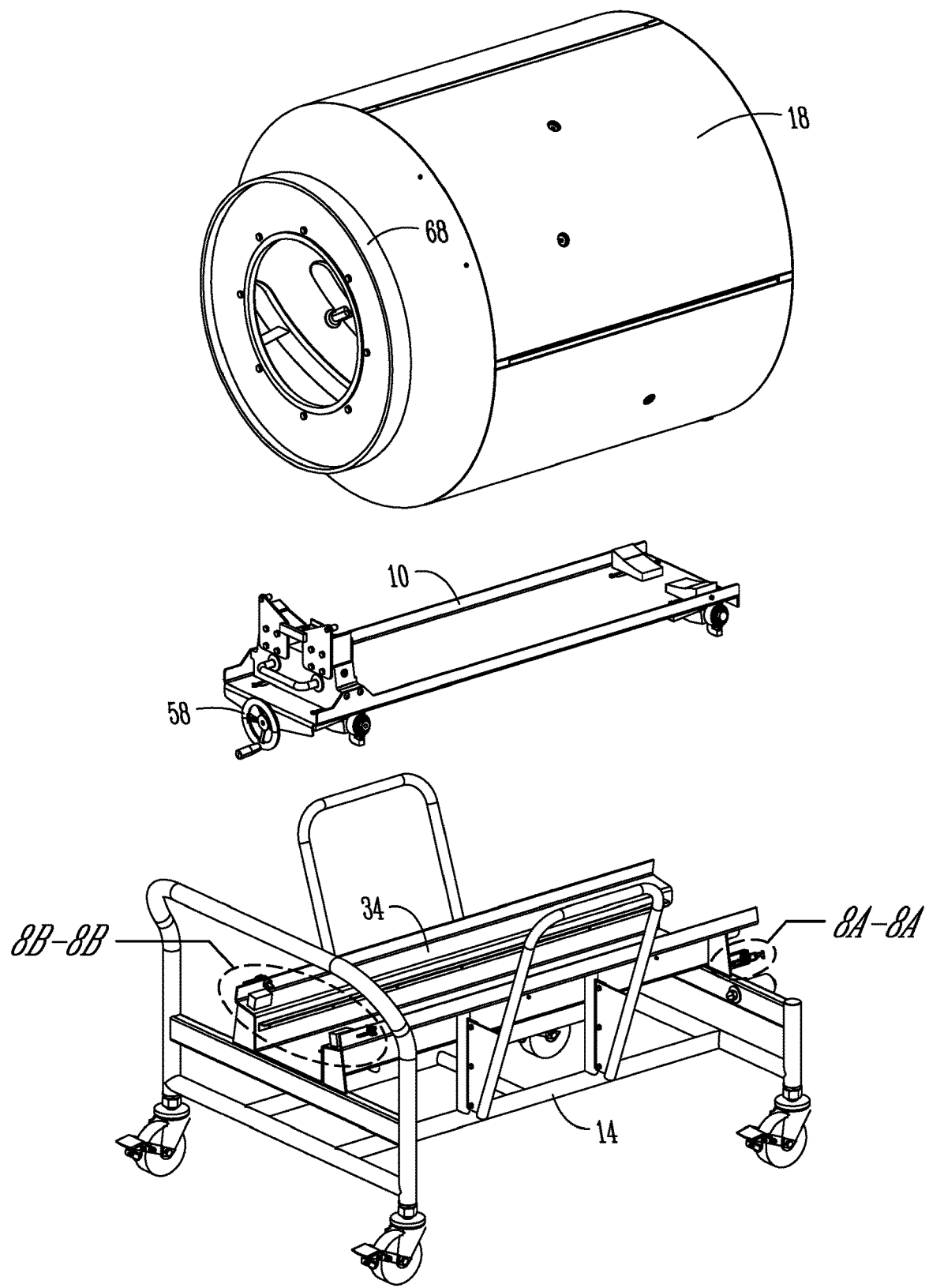
FIG. 7 is an exploded view of the cart, trolley, and pan.
Figure 8A:
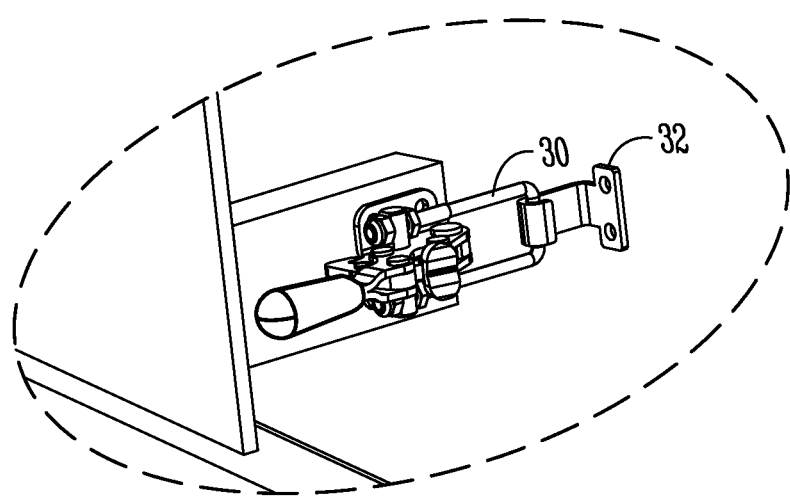
FIG. 8A is an enlarged view taken along lines A-A of FIG. 7, showing one of the latches of the cart connected to a hook of the machine housing.
Figure 8B:
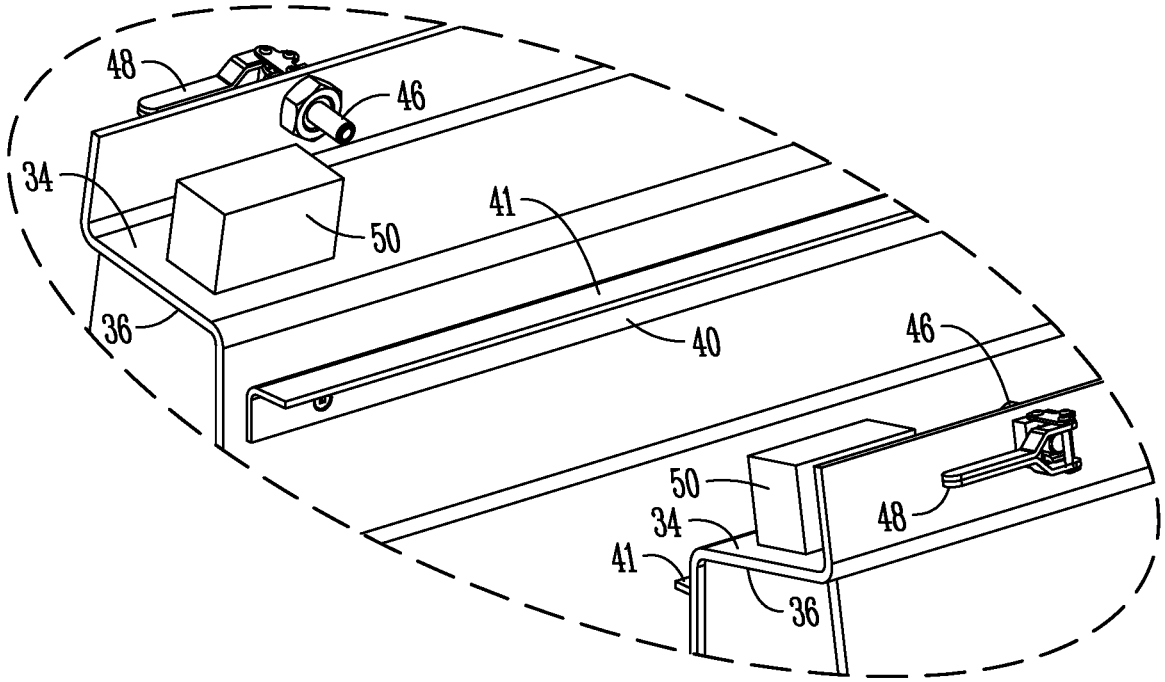
FIG. 8B is an enlarged view taken along lines B-B of FIG. 7, showing the pin assembly for securing the trolley to the cart.
Figure 9C:
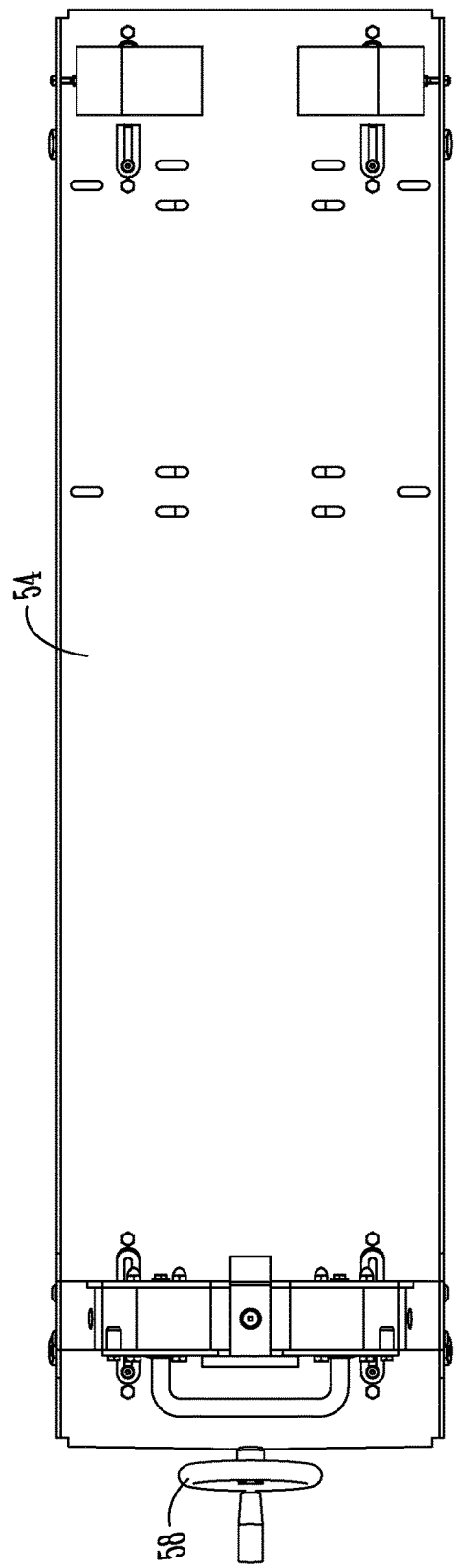
FIG. 9C is a top plan view of the trolley.
Figure 9D:
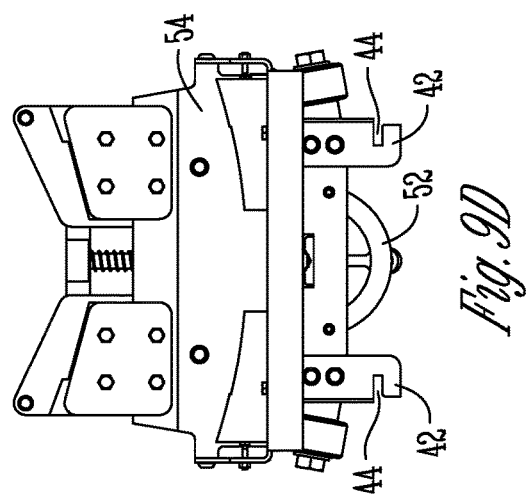
FIG. 9D is an end elevation view of the trolley in a lowered position.

The cart 14 includes a cradle 34 to support the trolley 16. As seen in FIG. 8B, the cradle includes a pair of tracks 36 which rollably support rollers or wheels 38 on the bottom of the trolley 16. The cradle 34 also includes a pair of rails 40 each having an inwardly extending lip or flange 41. The trolley 16 includes a pair of downwardly extending legs 42 each having a notch 44 to receive the rail lip 41 of the cradle 34, and thereby guide the rolling movement of the trolley 16 along the cart cradle 34. Thus, the trolley 16 moves between a retracted position on the cart 14, as shown in FIGS. 1, 2 and 5, and an extended position within the housing 22, as shown in FIGS. 3 and 4. The cart 14 also has a pair of pins 46 adjacent the rearward end which can be extended and retracted via pivotable handles 48. When the trolley 16 is in the retracted position on the cradle 34, the handles 48 can be moved to extend the pins 46 into aligned holes (not shown) of opposite sides of the trolley 16, and thereby lock the trolley in position on the cart 14. The cart cradle 34 also includes blocks 50 on the rear end of each track 36 to limit the rearward movement of the trolley 16 along the tracks 36.

Figure 10A:
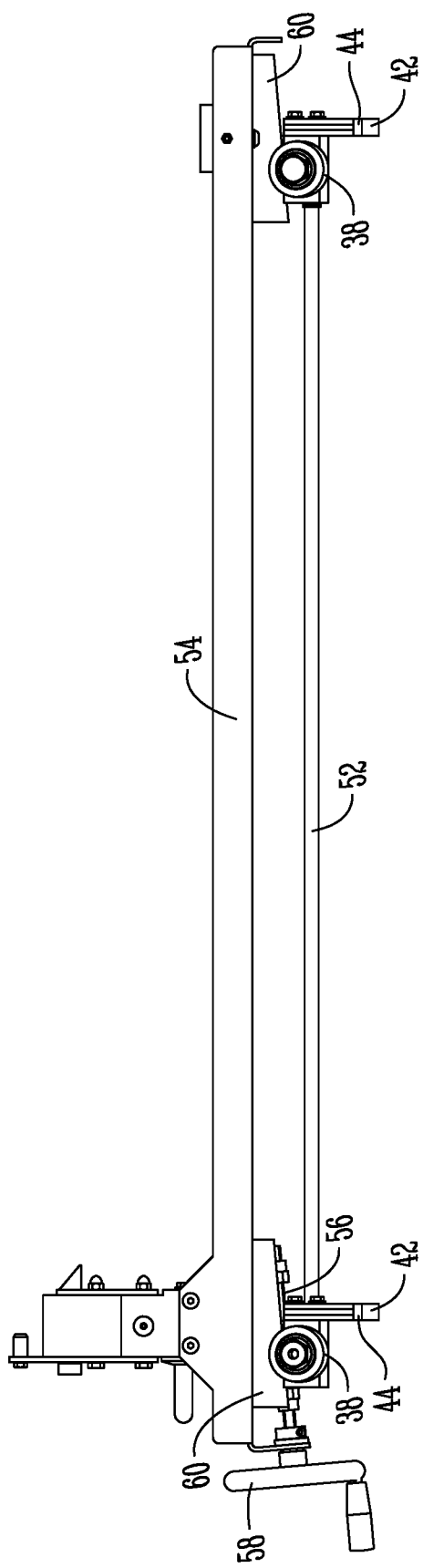
FIG. 10A is a side elevation view of the trolley in a raised position.
Figure 10B:
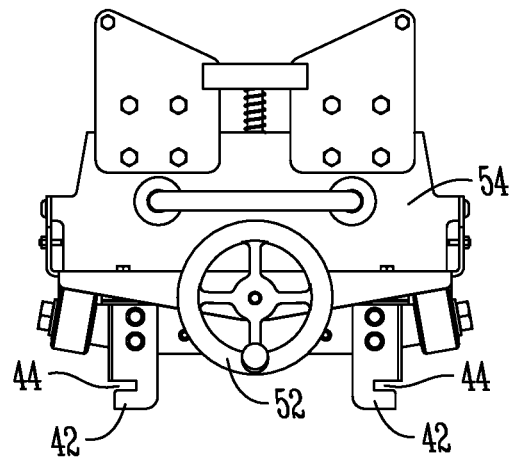
FIG. 10B is an end elevation view of the trolley in a raised position.
Figure 10C:
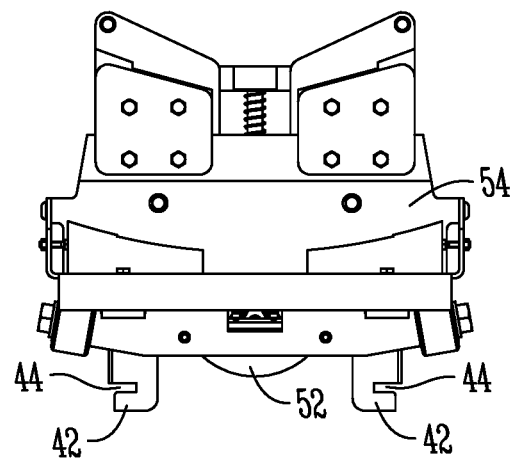
FIG. 10C is an end elevation view from the opposite end of FIG. 10B, with the trolley in a raised position.

The details of the trolley 16 are shown in FIGS. 9A-9D and FIGS. 10A-10C. The trolley 16 includes a base or frame 52 upon the which the wheels 38 are mounted. A bed 54 is mounted on the frame 52 and is moveable between a lowered position (FIG. 9A) and a raised position (FIG. 10A). The up and down movement of the bed 54 is controlled by a jack. For example, the jack may be a threaded shaft 56 which can be turned in opposite directions by a handle or wheel 58 so as to slide the bed 54 forwardly and rearwardly relative to the frame 52 whereby wedges 60 at each corner of the bed 54 lift or lower the bed 54 on the frame 52. Alternatively, the jack can be a linear actuator with an electric motor, or a hydraulic or pneumatic cylinder; or any other device which can lift and lower the pan for positioning in the coating chamber.

The bed 54 is adapted to support various sized pans 18. The selected pan 18 is normally in a lowered position on the bed 54 of the trolley 16. After the cart 14 is indexed to the housing 22 via the alignment of the extensions 26 and bosses 28, and locked to the housing via the latches 30 and hooks 32, the trolley 16 with one of the pans 18 sitting thereon can be rolled through the housing opening 20 and into the housing 22. The housing 22 includes tracks 62 which align with the tracks 36 of the cart, such that the trolley wheels 38 can roll smoothly from the cart 14 into the housing 22. After the trolleys 16 and pan 18 are positioned inside the coating chamber of the housing 22, the wheel 58 can be turned to raise the bed 54 and the pan 18, such that the pan can be coupled to the rotatable drive 64 of the machine 12, as explained below. After the pan 18 is raised, a pair of support rollers 66 are to be installed on the tracks 62 in alignment with a ring 68 on the end of the pan 18. Then, with the pan 18 supported by the drive 64 and rollers 66, the bed 54 can be lowered by rotation of the wheel 58 in the opposite direction. Then, the trolley 16 can be removed from the housing 22 of the coating machine 12. The tracks 36 help center the trolley 16 on the cart 14 and as the trolley moves out of or into the housing enclosure 22. The guide rails 40 also prevents the trolley 16 from tipping off the cart 14 if someone were to push on the pan 18 from one side. Since the pan is unlikely to be pushed from a side after being positioned within the housing enclosure 22, there is no need for retainer rails (similar to rails 40) inside the housing 22.

Figure 11A:
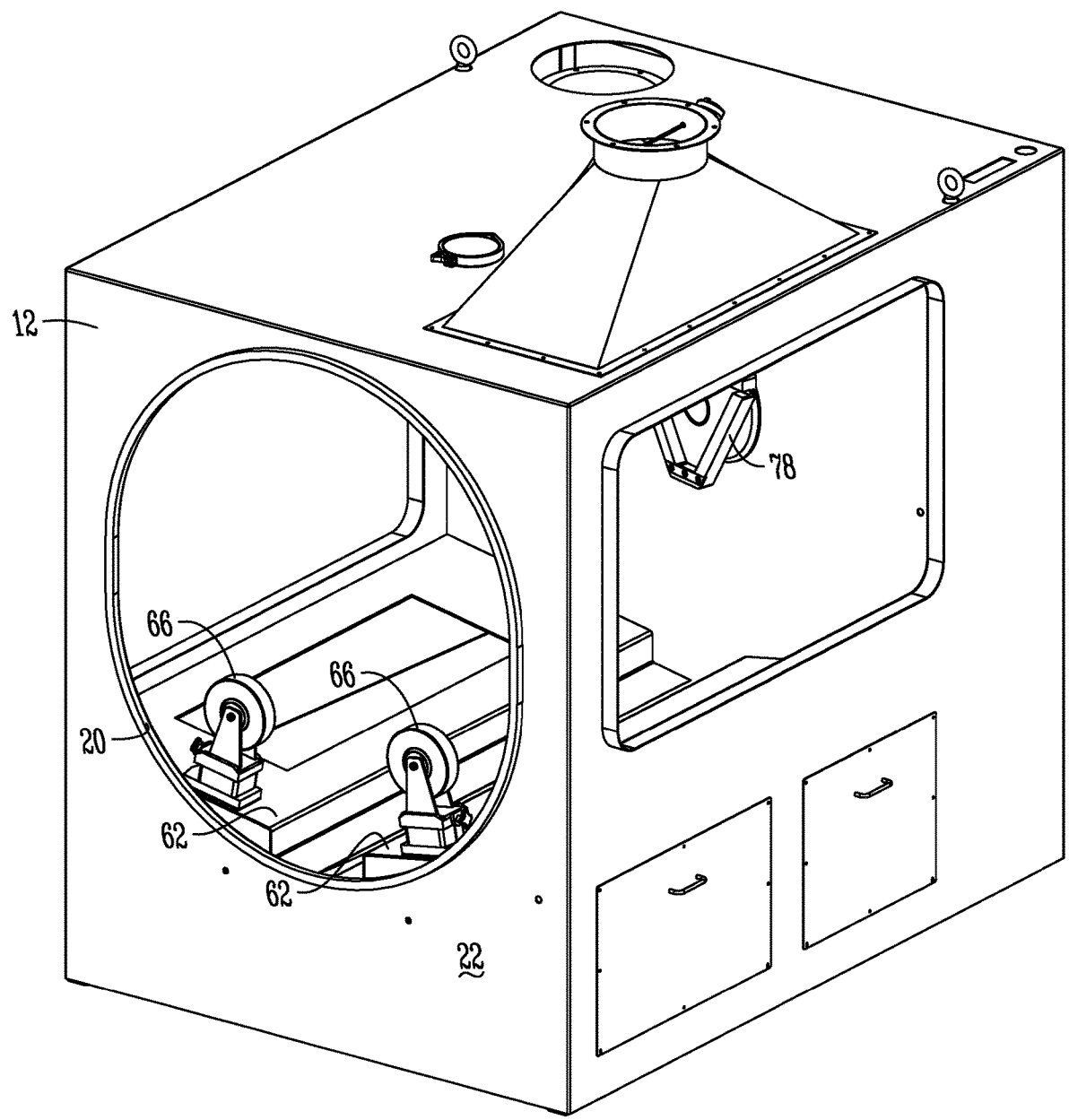
FIG. 11A is a view of the machine housing or enclosure, with the support rollers mounted therein.
Figure 11B:
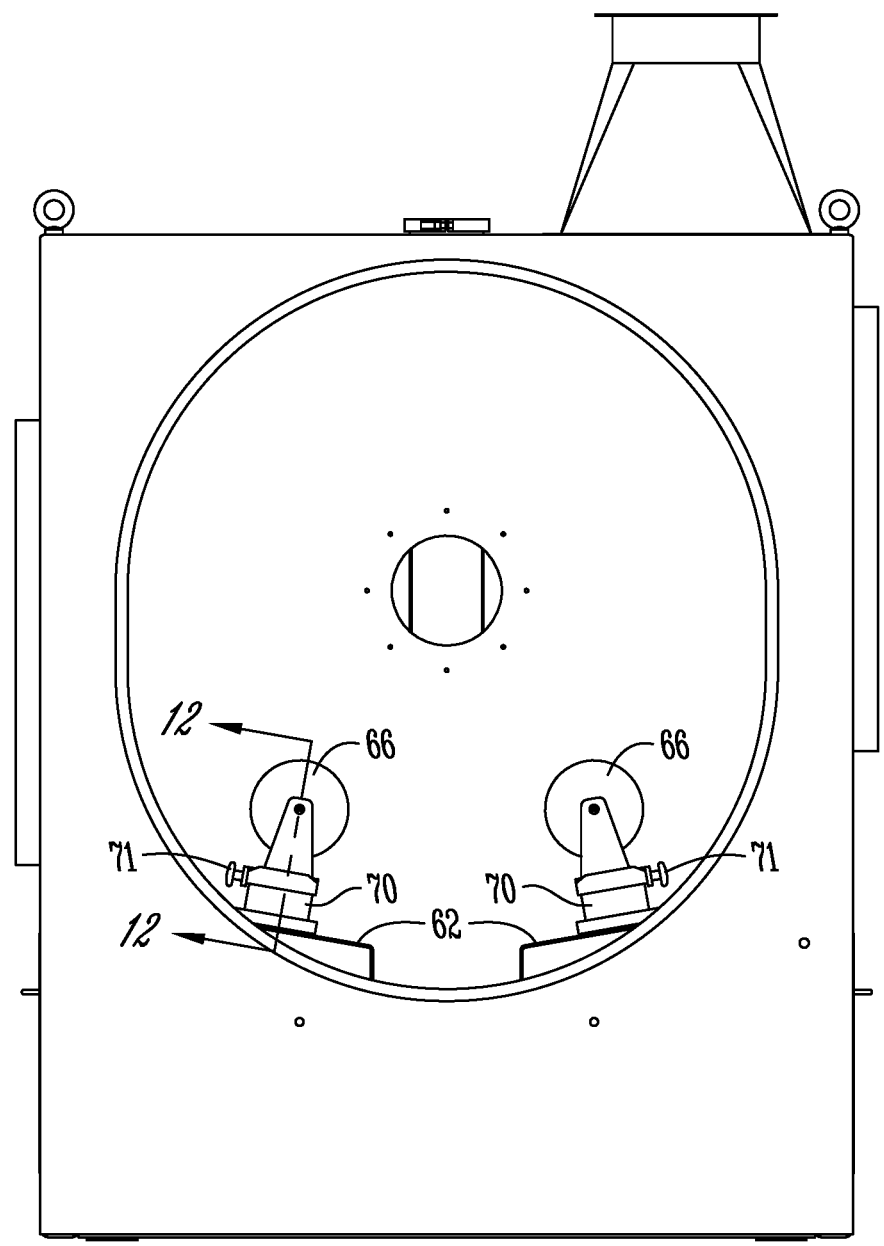
FIG. 11B is an end elevation view of enclosure with the rollers.
Figure 12:
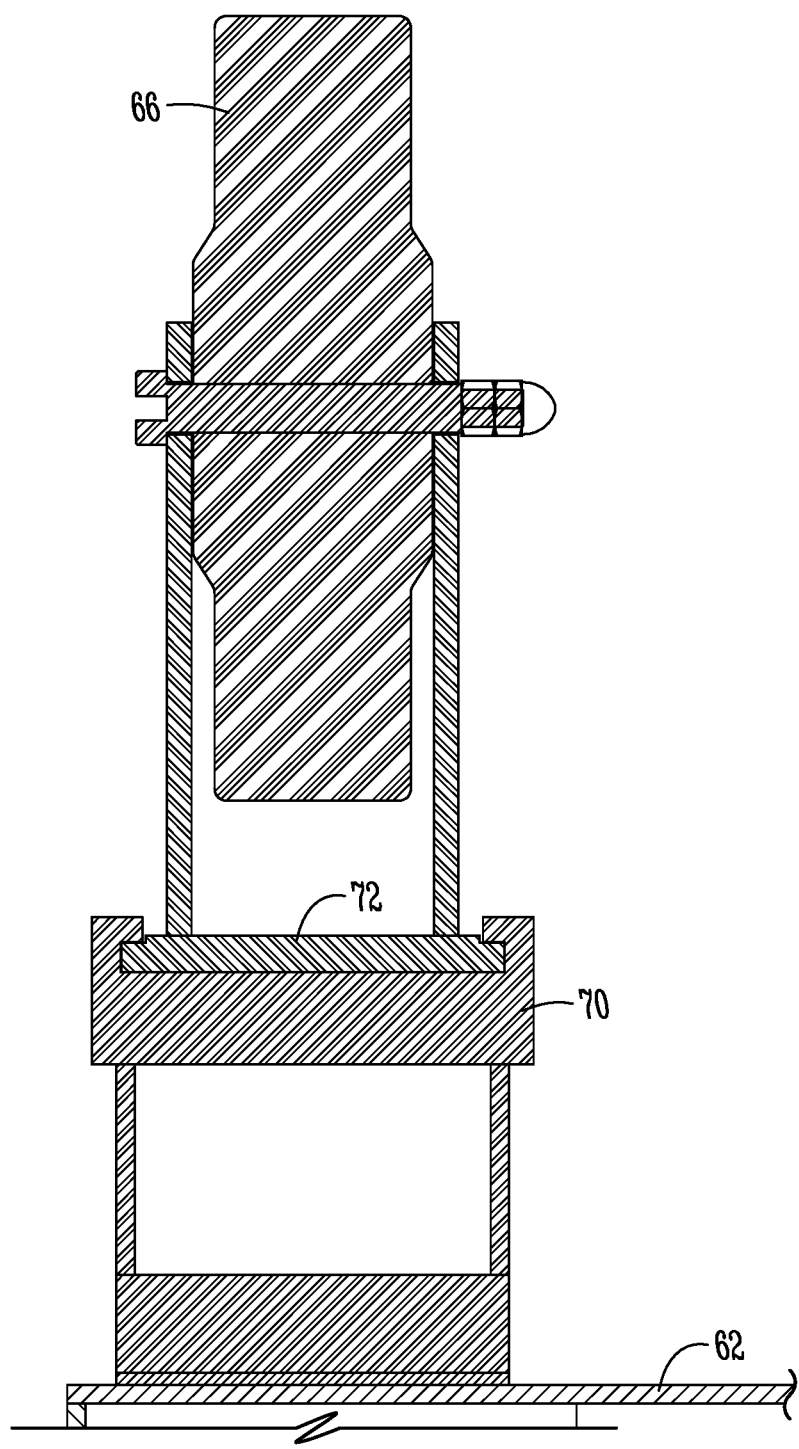
FIG. 12 is a sectional view taken along lines 12-12 of FIG. 11B.
Figure 13A:
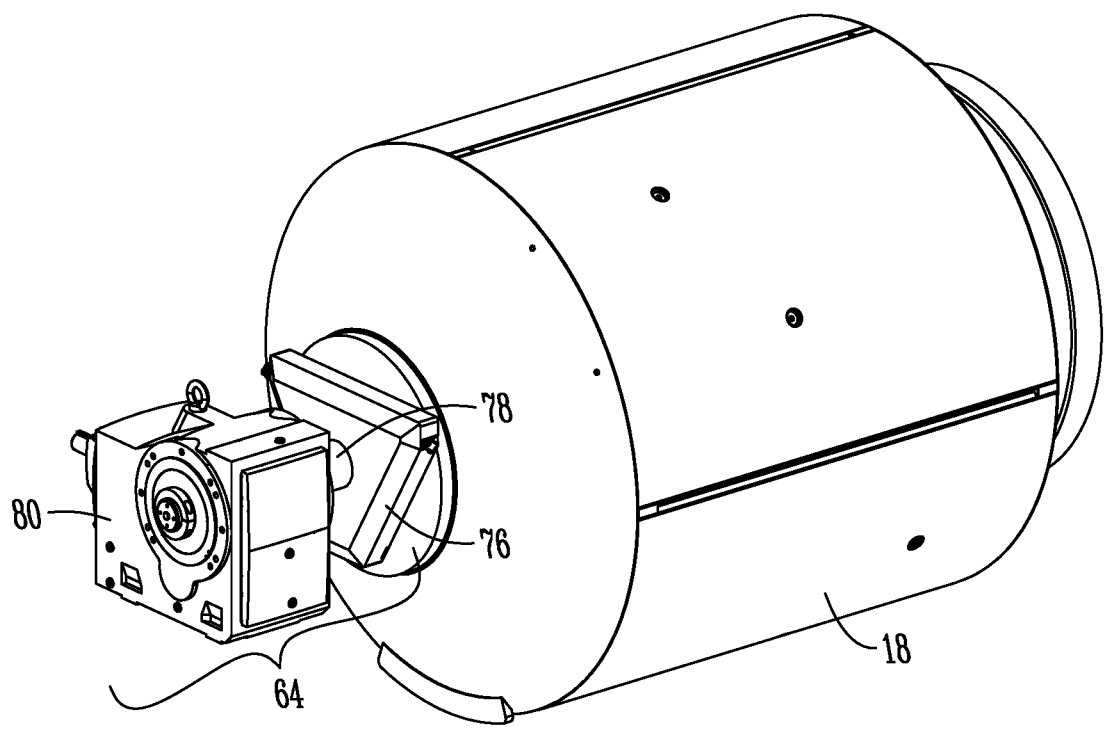
FIG. 13A is a perspective view showing the pan coupled to the rotatable drive of the coating machine.
Figure 13B:
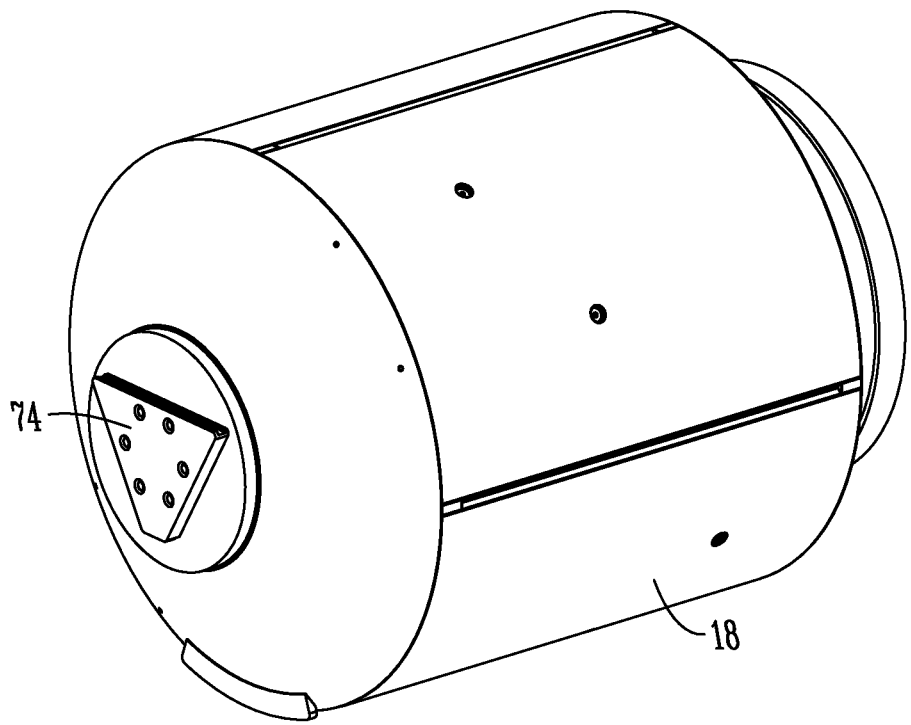
FIG. 13B is a perspective view of the pan showing the drive coupler, with the rotatable drive removed.
Figure 13C:
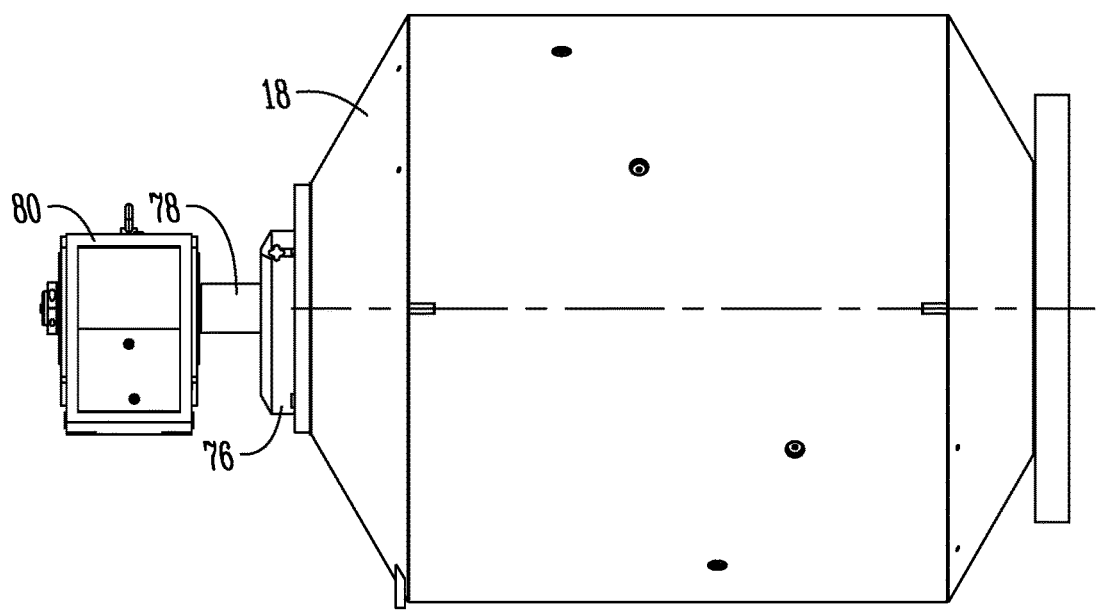
FIG. 13C is a side elevation view of the pan and rotatable drive.
Figure 13D:
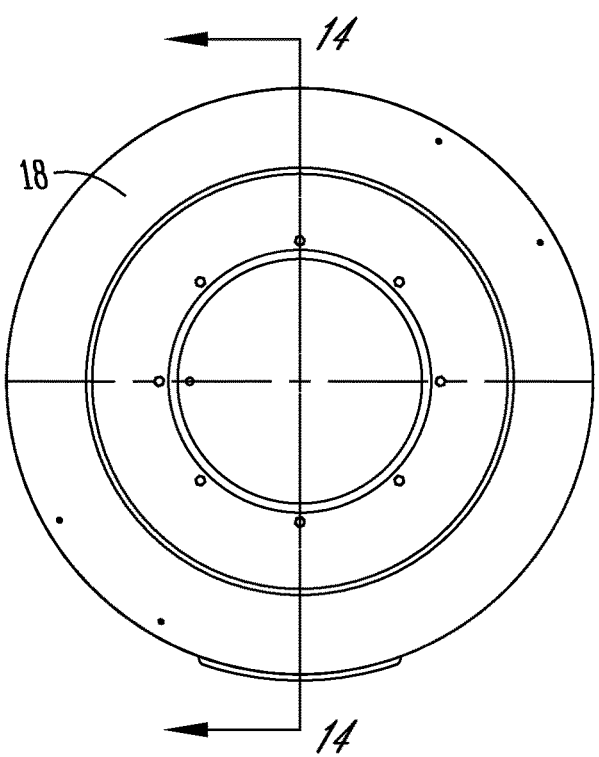
FIG. 13D is an end view of the pan from opposite the drive coupler.
Figure 14:
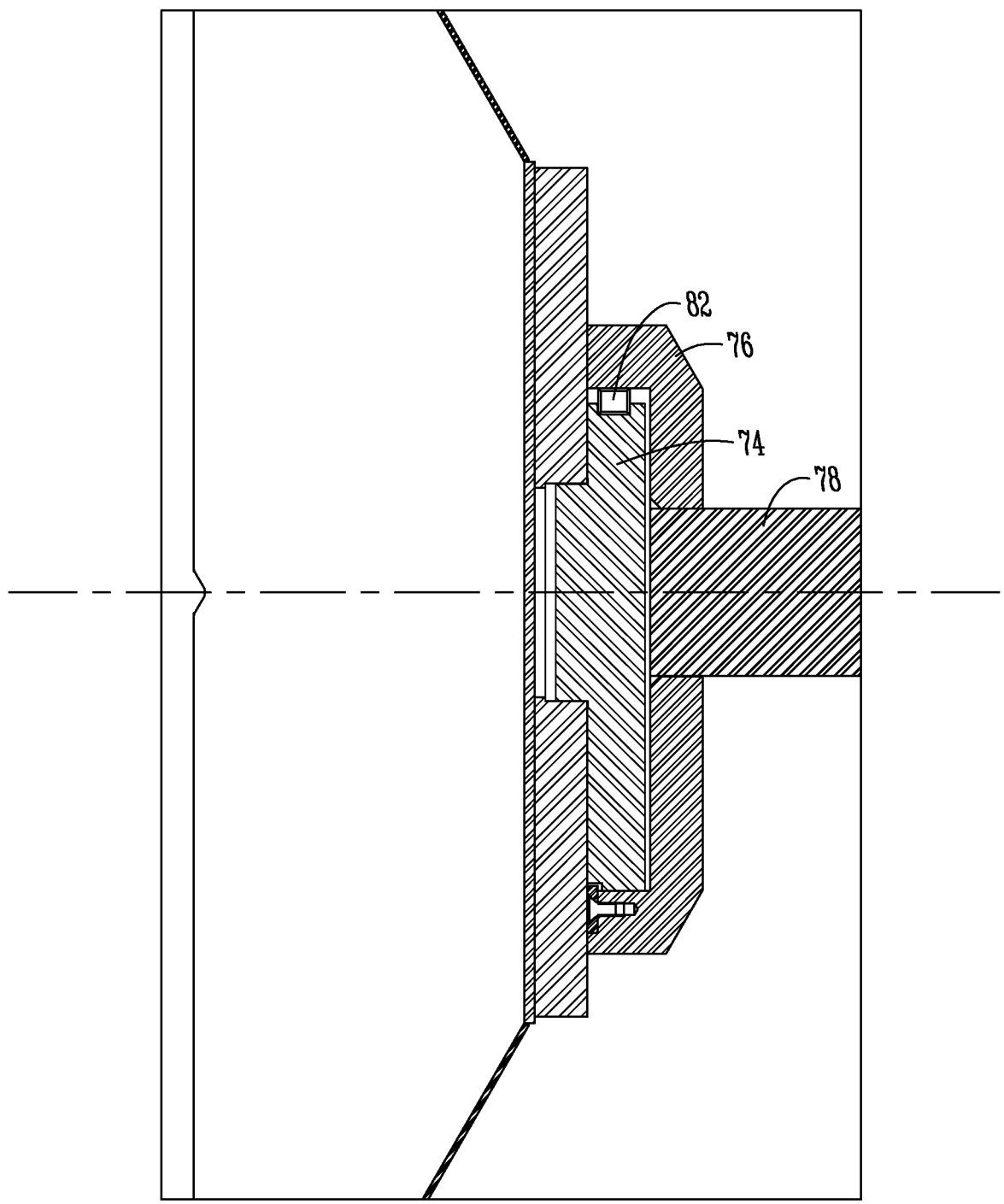
FIG. 14 is a sectional view taken along lines 14-14 of FIG. 13D showing the drive coupler and rotatable drive.
Figure 15:
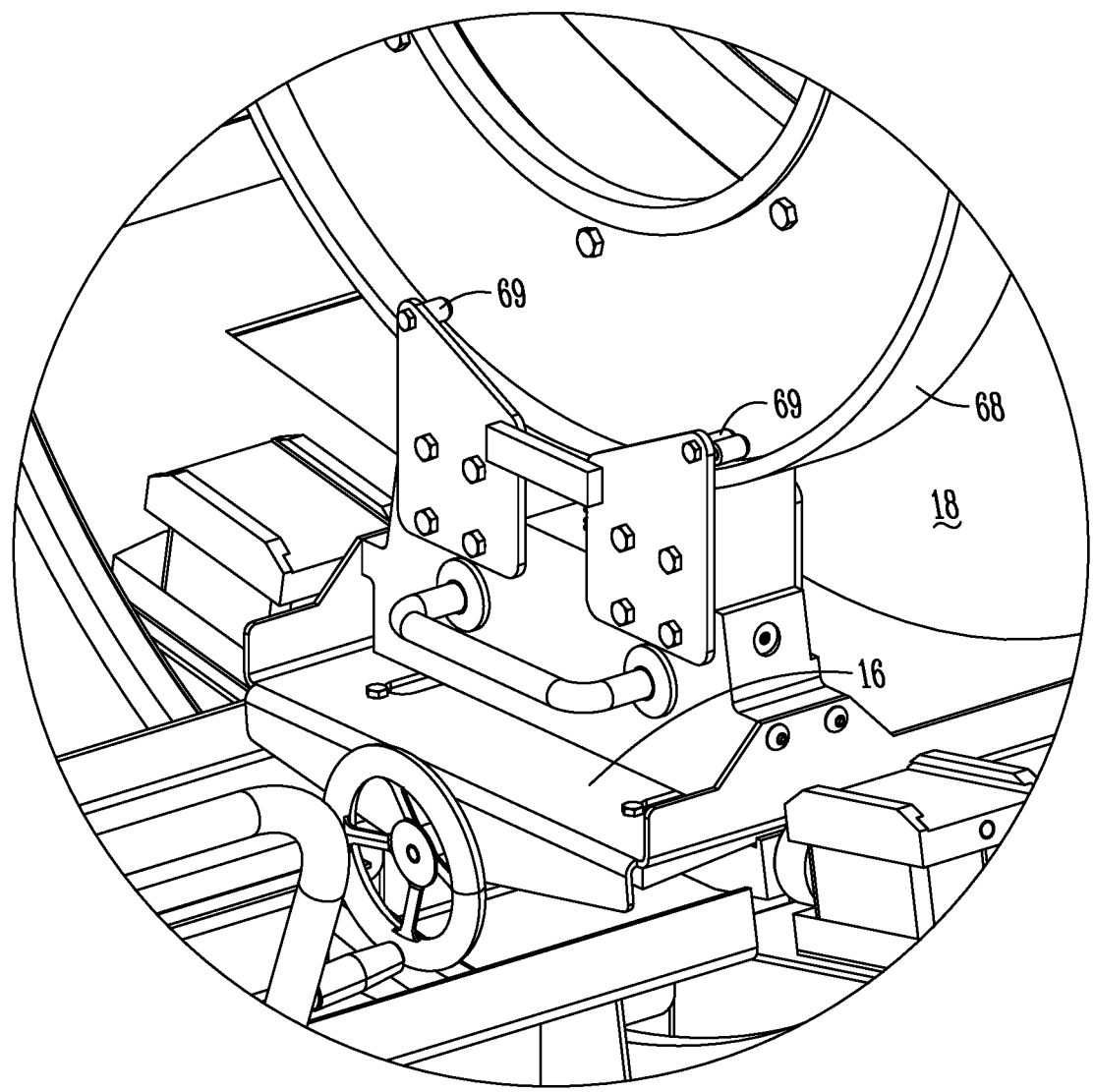
FIG. 15 is an enlarged perspective view taken along lines 15-15 of FIG. 3 and showing the pan retention pins of the trolley.
Figure 16B:
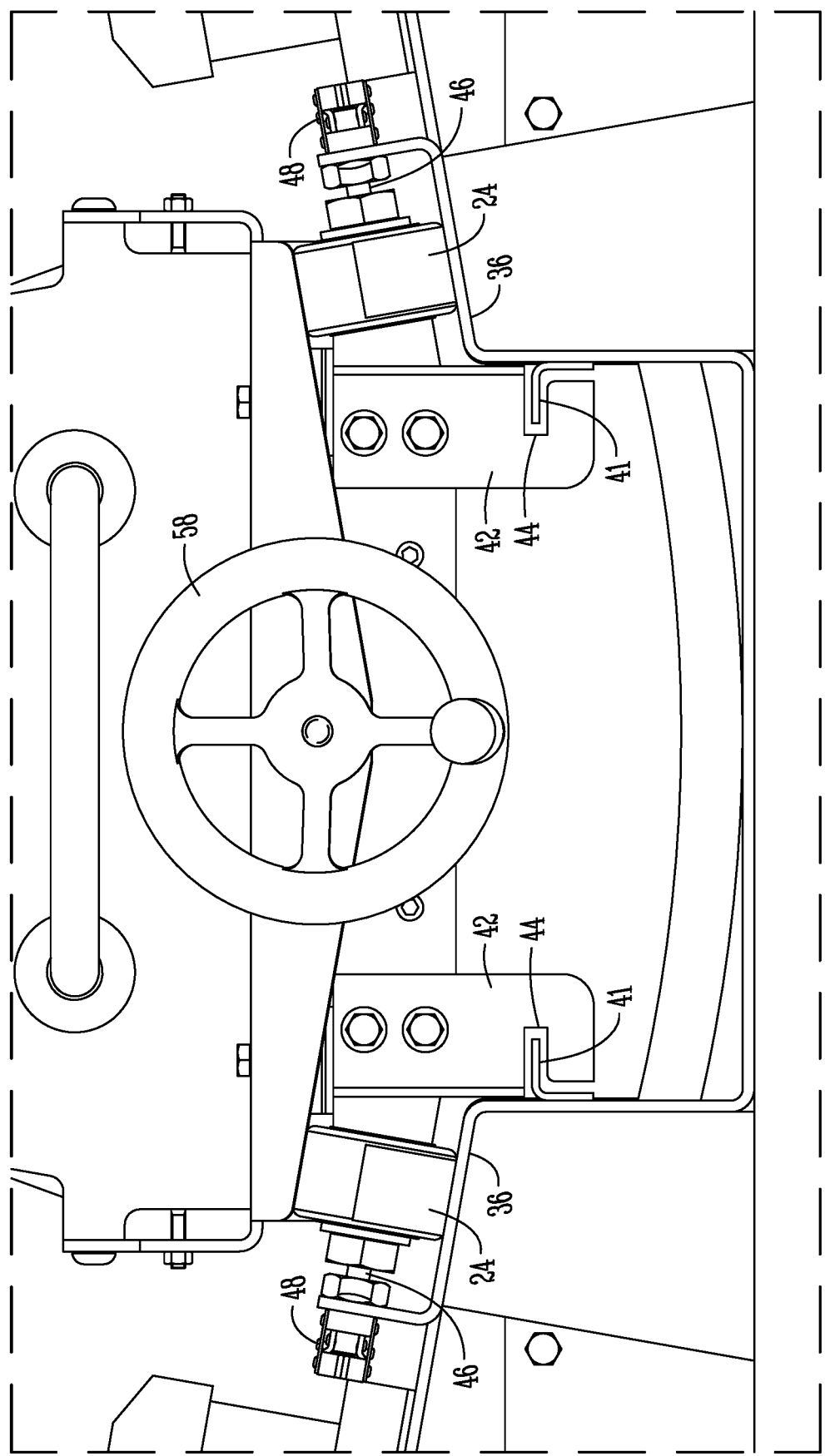
FIG. 16B is an enlargement taken along lines B-B of FIG. 16A.

As seen in FIGS. 11B and 12, a support block 70 is provided on the top of each track 62, with a top of each block 70 having a slot for slideably receiving the base of 72 of the castor wheels 66. Thus, the rollers or wheels 66 can be quickly and easily mounted and removed in the coating chamber after the pan or drum 18 is moved into the chamber and raised. The castor wheels 66 and support base 72 are secured using a hand knob or bolt 71.

As shown in FIGS. 13A, 13B, 13C, and 14, the rear end of the pan 18 includes a triangular plate 74 which is received within a pocket in a drive plate 76 of the coating machine 12. The plates 74 and 76 preferrably have mating tapered surfaces to provide automatic self-centering on alignment of the pan 18 in the coating chamber of the machine 12. The drive plate 76 is on the end of a drive shaft 78 operably connected to a motor (not shown). A reducer 80 maybe provided between the motor and the drive shaft 78. A lock pin or knob 82 may be provided to secure the connection between the driven plate 74 and the drive plate 76. As an alternative to the male and female coupling plates 74, 76, the pan 18 can be connected to the drive motor of the coating machine 12 for rotation in any other convenient manner.

In use, the cart 14 with the trolley 16 and pan 18 mounted thereon is rolled up to the coating machine 12, and indexed thereto by the extensions 26 and bosses 28, and latched to the machine 12 via the latches 30 and hooks 32. Then, the trolley 16 with the pan 18 thereon is moved through the opening 20 of the machine 12. The bed 54 of the trolley 16 is raised, either before or after entrance into the housing 22, such that pan plate 74 is aligned with the machine drive plate 76, so that the plates 74, 76 can be locked together with the lock mechanism 82, which includes a pin for insertion into the plates via a knob (not shown). The castor rollers 66 are mounted on the blocks 70. Then, the bed 54 is lowered, such that the drum is supported at opposite ends by the drive plate 76 and by the rollers 66, thereby allowing the trolley to be removed from the housing 22. Then, the cart 14 can be detached from the housing 22 and moved away, such that the door 84 of the machine 12 can be closed over the opening 20. The machine 12 is then ready to begin the coating process. One or more spray nozzles (not shown) connected to a container of spray solution extend into the pan 18 for spraying the solution onto the tumbling contents of the pan as the pan rotates. When the coating process is complete, the pan 18 and interior of the machine 12 can be cleaned. Then, the door 84 can be opened, the cart 14 can be indexed and secured to the housing 22, and the trolley 16 can be moved into the housing beneath the pan 18. The locking pin 82 is removed from engagement with the plates 74, 76 so that the trolley bed 54 can then be raised to lift the drum off the rollers 66, which are then removed from the blocks 70, such that the trolley 16 and pan 18 can be withdrawn from the housing 22, for removal. The coated material is normally removed from drum before drum removal or exchange.

Thus, by removing the trolley 16 from the machine 12 before the sprayer is actuated, cleaning of the spray chamber and pan 18 inside the machine, after spray coating is completed, is much simpler since the trolley 16 does not need to be cleaned.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A coating machine for particulate material, comprising:
a housing with an opening and a door for the opening;
a cart;
a trolley rollable along the cart;
a drum for holding particulate material and being removably supported on the trolley without rotation;
the cart being movable to a position adjacent the housing opening; and
the trolley being extendable from the cart and through the housing opening to position the drum within the housing and then being retracted along the cart for removal from the housing while the drum remains in the housing for a coating operation.

2. The coating machine of claim 1 wherein the housing has casters for rotatably supporting the drum, the casters being independent from the trolley.

3. The coating machine of claim 2 wherein the casters are removably mounted in the housing and are installed in the housing after the drum is positioned in the housing.

4. The coating machine of claim 1 wherein one of the trolleys and the cart has wheels for rollably supporting the trolley on the cart.

5. The coating machine of claim 1 wherein the trolley includes a jack for lifting the drum.

6. The coating machine of claim 1 wherein the trolley is configured to be removed from the housing before the coating operation begins.

7. A coating machine for particulate material, comprising:
a housing having an inlet opening;
a drum for holding particulate material;
a trolley to support the drum;
the trolley being movable from a first position outside the housing for product loading and unloading and a second position inside the housing for positioning the drum for product coating; and
the drum being removed from the trolley inside the housing before product coating begins.

8. The coating machine of claim 7 further comprising a cart to rollably support the trolley.

9. The coating machine of claim 8 further comprising indexing members on the cart and on the housing to align the trolley with the inlet opening.

10. The coating machine of claim 7 further comprising rollers inside the housing to support the drum for rotation about a longitudinal axis.

11. The coating machine of claim 7 further comprising a drive connection in the housing to engage with the drum and rotate the one drum about a substantially horizontal axis.

12. The coating machine of claim 7 wherein the trolley is removed from the housing before product coating begins.

13. The coating machine of claim 7 wherein the trolley includes a jack to adjust the vertical position of the drum.

14. The coating machine of claim 7 wherein the trolley supports the drum for horizontal and vertical movement relative to the trolley.

15. The coating machine of claim 7 wherein the drum is interchangeable with a second drum on the trolley.

16. The coating machine of claim 7 wherein the trolley rolls between the first and second positions.

17. A coating machine for particulate material, comprising:
a product coating chamber;
a drum for containing particulate material;
a trolley supporting the drum and being rollable into and out of the coating chamber; and the drum being removable from the trolley inside the coating chamber; and the trolley being removed from the coating chamber while particulate material in the drum is coated in the coating chamber.

18. The coating machine of claim 17 wherein the trolley is rollably supported on a cart for horizontal movement into and out of the coating chamber.

* * * * *